UNITED STATES PATENT OFFICE.

JAMES W. C. HAMILTON, OF LIVERPOOL, ENGLAND, ASSIGNOR OF TWO-THIRDS TO JOSEPH AMOS LINLEY, OF SYDNEY, NEW SOUTH WALES.

PROCESS OF MAKING MEAT EXTRACTS.

SPECIFICATION forming part of Letters Patent No. 636,525, dated November 7, 1899.

Application filed June 12, 1899. Serial No. 720,287. (No specimens.)

*To all whom it may concern:*

Be it known that I, JAMES WILLIAM CLAUDE HAMILTON, manufacturer, a subject of the Queen of Great Britain, residing at Liverpool, in the county of Lancaster, England, have invented certain new and useful Improvements in the Process of Rendering Albuminoids of Meat Permanently Soluble, of which the following is a specification.

This invention has for its object the permanent preservation of the albuminoids of meat in such form as to remain soluble and will be capable of being kept for any length of time.

The invention consists in first dissolving the meat fibrine freed from fat in a weakly-alkaline solution and then adding trioxymethylene and keeping it at from 240° to 250° Fahrenheit until it will no longer coagulate on cooling, then neutralizing with a wholesome acid—such as phosphoric, hydrochloric, or acetic acid—and evaporating to dryness.

In carrying out my invention I add to this meat fibrine from three to six times its weight of water. The exact amount cannot be given, as it differs with the various kinds of meat. To this water should be added about two or more per cent. of salt and about one per cent. of carbonate, hydrate, or oxide of sodium or potassium. These materials are digested together at from 180° to 200° Fahrenheit for about eight hours. Then trioxymethylene or formic aldehyde, but preferably the former, is added to the extent of half per cent. by weight of the meat, and the heat is raised from 240° to 250° Fahrenheit and retained at this point for another eight hours, or thereabout. The solution is now neutralized by some acid not having a deleterious effect—such as, for instance, phosphoric, hydrochloric, or acetic acid—care being taken that it is thoroughly mixed, and for this purpose it is sometimes desirable to add a little extra water, so as to make the mixture more fluid. It is then filtered, so as to separate the insoluble residue, and the solution is evaporated to dryness. This can now be kept in the dry state for an indefinite period of time; how long my experiments have yet failed to demonstrate.

I use the trioxymethylene or formic aldehyde as a digestive agent in preference to hydrochloric acid and pepsin.

I claim as my invention—

1. The process of preserving the fibrine of meat in a soluble form, which consists in digesting it in a slightly-alkaline solution a little below boiling-point until it is in large part dissolved, then adding trioxymethylene or formic aldehyde and digesting it from 240° to 250° Fahrenheit until the dissolved portion becomes permanently soluble, filtering out the residue and evaporating to dryness.

2. The improvement in preserving albuminoids which consists in adding to their solution trioxymethylene or formic aldehyde and maintaining at 240° Fahrenheit until the albuminoids become permanently soluble.

In witness whereof I have hereunto signed my name, this 5th day of May, 1899, in the presence of two subscribing witnesses.

JAS. W. C. HAMILTON.

Witnesses:
G. C. DYMOND,
W. H. BEESTON.